Aug. 23, 1949.  E. A. ERNST  2,479,823
PLURAL CONVEYER ARRANGEMENT
Filed March 3, 1945  2 Sheets-Sheet 1
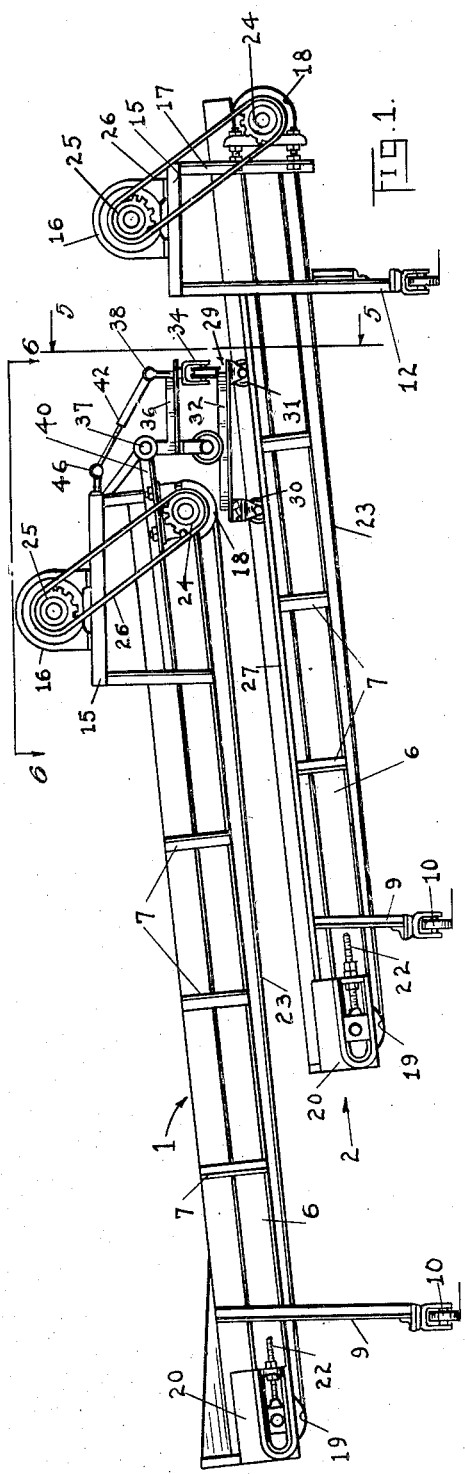
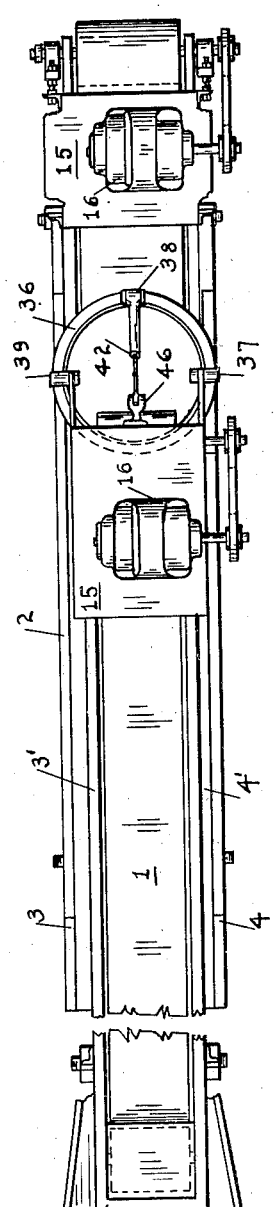
INVENTOR.
EARL A. ERNST
BY Earl E. Moore
ATTY.

Aug. 23, 1949. E. A. ERNST 2,479,823
PLURAL CONVEYER ARRANGEMENT
Filed March 3, 1945 2 Sheets-Sheet 2
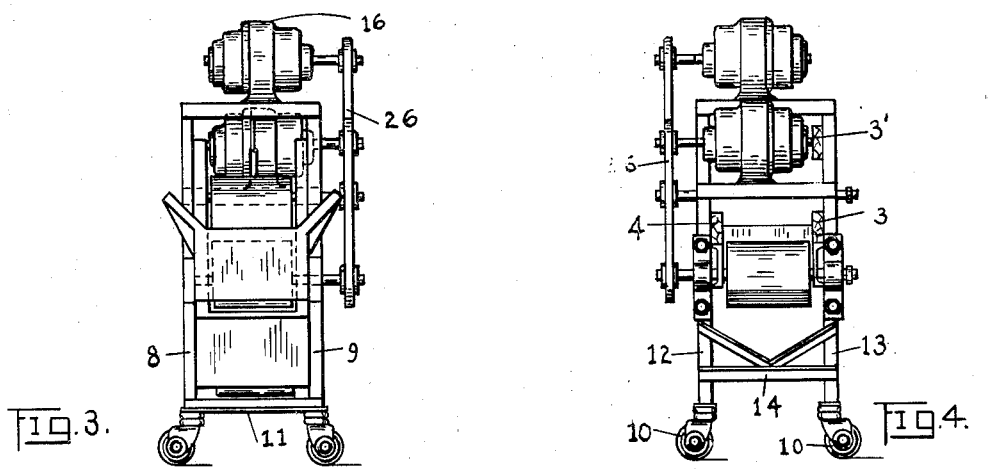
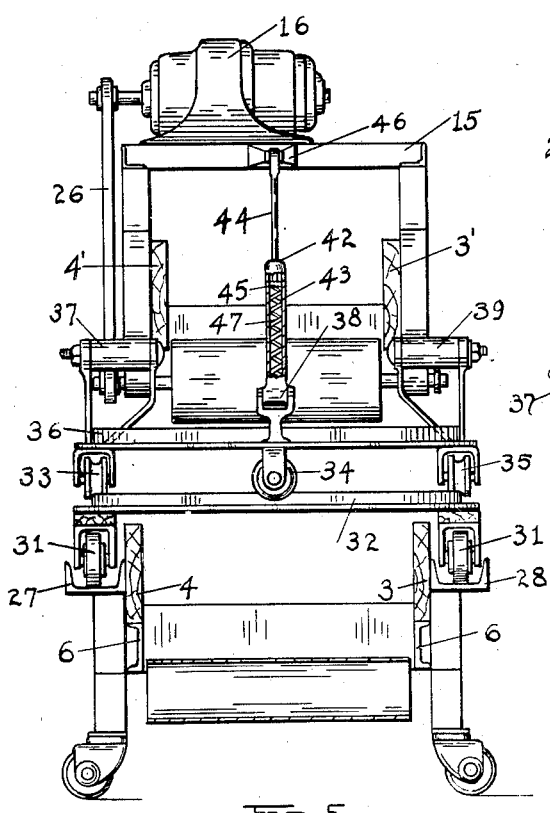
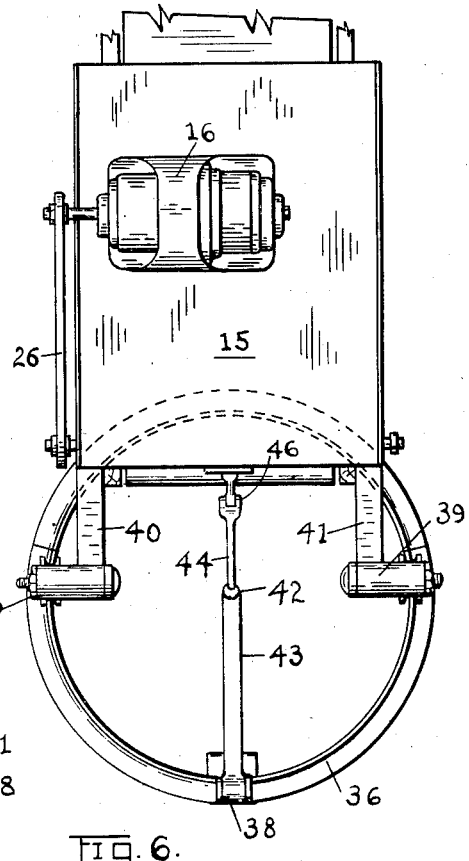
INVENTOR.
EARL A. ERNST.
BY
Earl E. Moore
ATTY.

Patented Aug. 23, 1949

2,479,823

UNITED STATES PATENT OFFICE 2,479,823

PLURAL CONVEYER ARRANGEMENT

Earl A. Ernst, Bakersfield, Calif.

Application March 3, 1945, Serial No. 580,890

4 Claims. (Cl. 198—89)

This invention is in relation to conveyors for carrying articles, etc. upon endless belts to particular places, the conveyors or groups thereof being constructed and arranged for extension and contraction coupled with pivoting means for connecting two or more of the conveyors so that articles can be carried in angled directions should straight line conveyance not be feasible or desired. The conveyors are of the portable type so that they can be coupled at will and shifted from place to place where needed. Such an invention as this is especially useful in the loading and unloading of trucks and freight cars in that the conveyors can readily be shifted and angled to connect trucks and cars with a stationary unit, for instance, a potato cleaning, grading and sacking unit or system.

Therefore, a plurality of conveyor units are arranged having pivot connection with one another, the pivot connection means being positioned upon a carriage or truck which is adapted to run along any conveyor unit or units so that the conveyor units are not only pivoted together for angle-directional carriage of articles, but also extensible and contractable; this construction making it possible to connect any loading and delivery platform with a specific station within reasonable distances.

One of the principal objects of this invention is to present a new and novel system for the transference of articles from one station to another with dispatch and safety, the means employed being simple and sturdy in construction, and economical to make and manufacture.

Another object is to provide a plurality of endless belts, chain or the like, for carrying articles which have means for pivoting them together for transference of articles from one belt to another, trucking means being provided so that the length of the belt-combination can be extended or contracted at will.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 shows a preferred form of the invention in side elevation.

Fig. 2 is a plan view of Fig. 1.

Fig. 3 is an end elevational view at the left end of Fig. 1.

Fig. 4 is an end elevational view at the right end of Fig. 1.

Fig. 5 is a partly sectional and a partly elevational portion of Fig. 1 taken substantially along the line 5—5 thereof, and drawn to a larger scale.

Fig. 6 is a plan view taken substantially along the line 6—6 of Fig. 1, and drawn to a larger scale.

This particular showing of the invention includes the combination of two endless belt units indicated in general by the reference characters 1 and 2. Each one of the units comprises a wooden plank framework having the elongated side members 3 and 4 and the cross end members 5. The end members are for the lower ends of the units to avoid loss of articles which are being conveyed to the upper or higher ends of each unit. Screwed or bolted to each side plank is a channel iron member 6, the edges of which are flush with the outer sides of the planks so as to acommodate the plurality of uprights, ribs or angle-irons 7 which are welded thereto. The webs of these angle-irons 7 are screwed or bolted to the sides of the planks so as to give rigidity to the plank sides.

The endless belt unit 2 is supported from the ground by the short legs or angle-irons 8 and 9 which are affixed to the sides of the planks like the angle-irons 7 and have at their lower ends the swivel casters 10. Angle-iron cross-beams 11 are provided between the short legs to tie the legs and hence the sides together. A similar support is provided at the high end of the endless belt unit which comprises the long legs or angle-irons 12 and 13 and the cross tie-beam 14, these legs also having the swivel casters 10.

At the top of the long legs 12 and 13 is a platform 15 of rectangular form and fabricated from a plurality of angle-irons and plates in an obvious manner for supporting an electric motor 16 or any other kind or type of power device. Short legs 17 also give support to the motor platform and have the webs of their angle-irons screwed or bolted to the side planks.

At each end of endless belt unit 2 is a roller, the roller 18 having its ends journalled in bearing brackets fixed to the bottoms of the channels 6, and a roller 19 which has its ends journalled in shiftable bearings guided in the slots of plates 20 which are firmly fixed to the sides of the planks 3 and 4; the bearings in this case being adjustable by screw-rods 22, this manner of supporting and adjusting bearings of rollers being well known in the art. An endless belt 23 is linked to the rollers for the purpose of being driven and to carry articles from one end to the other end thereof. The roller 18 has a sprocket or pulley 24 fixed thereto and the motor shaft has a sprocket or pulley 25 fixed thereto, the two sprockets or pulleys are linked together by the endless chain or belt 26, so that power can be transferred from the motor to the endless belt 23.

The elements and parts of unit 1 which are the same as the elements or parts of unit 2 have been given the same reference characters so as to simplify the description as much as possible, but the planks along the sides of the top conveyor have been indicated as 3' and 4'.

On each side of the unit 2, just a little below the top edges of the side planks 3 and 4, are fixed thereto the track channels 27 and 28, the channels being screwed or bolted to the planks and welded to the tops of the angle irons 7, 8 and 9 and to the sides of the long legs 12 and 13. This track or rail means 27—28 supports a shiftable carriage or truck 29 having the two wheels 30 and 31 on each side thereof, said carriage supporting on the top thereof a half circle monorail comprising the top edge of a curved angle-iron 32. On this monorail operate three wheels or pulleys indicated at 33, 34 and 35, the wheels supporting the end frame work which supports the high end of the endless belt unit 1. This end frame work comprises a curved angle-iron 36 which is firmly fixed to the top of the yokes of the pulley wheels 33, 34 and 35 and which is also fixed to the end of the unit by the pivot joints 37, 38 and 39, the extensions 40 and 41, and member 42, as shown. The member 42 comprises a pipe 43 with a closed lower end. In the other end of the pipe is a rod 44 having a disc 45 fixed thereto which can readily slide in the bore of pipe 43. The upper end of the rod is pivoted at 46 to a side of the motor platform. Within the pipe there is a compression spring 47 for the purpose of keeping the wheel 34 upon the rail 32 when the far end of the unit 1 is lifted and shifted about.

By the foregoing explained arrangement of parts, the units 1 and 2, as a combination, can be shortened or extended, and angled to suit most any condition for the loading and unloading of wagons and trucks at platforms, etc. with respect to a fixed stationary device, such as for instance, a potato cleaning and grading machine.

Obviously, the short legs of both units and the long legs of the bottom unit may be constructed so that they can be shortened or lengthened for the purposes of adjusting the levels of their respective endless belts. Furthermore, the tracks 27—28 and also the monorail 36 may have any suitable type or kind of suitable adjustable stop element or elements to prevent movement of the wheels thereon when the units are positioned for work.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a portable endless belt combination, a lower conveyor unit and an upper conveyor unit, means supporting the ends of the lower unit from a floor and other means supporting one end of the upper unit from a floor, the other end of the upper unit being supported by the lower unit, a track rail along each side of the lower unit, a truck having wheels on each rail which support a curved track, a curved frame pivotally attached to the said other end of the upper unit which has wheels journalled thereto and which ride upon the curved track, a pivoted tube attached to the curved frame having a compression spring therein and a plunger means, the plunger means having a rod attached thereto which extends from the tube and is pivotally connected with a portion of the said other end of the upper unit.

2. In a conveyor combination comprising a plurality of endless belt units, two of the units having a connection device, the device consisting of a shiftable carriage adapted to ride along a portion of one of the said units, the carriage having a curved monorail means and the end of the other of said units having a framework with wheels supported by the monorail, pivot means connecting the said other unit with the framework, the pivot means including an extension with resilient means which makes a self-adjusting strut to aid in keeping the wheels on the monorail.

3. The combination recited in claim 2 wherein the extension consists of a tube pivotally connected to the framework and having in the bore thereof a plunger under spring pressure to maintain the extension in extended position, a rod connected to the plunger and having its other end pivotally connected to a high point at the said end of the other of said units.

4. In a conveyor combination comprising an upper conveyor unit and a lower conveyor unit, the lower conveyor unit having a rail attached along each longitudinal side thereof to present a pair of rails, a carriage having wheels mounted on the pair of rails, a curved monorail fixed to a top side of the carriage, a curved framework extending from an end of the upper unit having a center wheel and end wheels mounted on the said monorail, a pair of trunnions extending upwardly from the framework above the end wheels and having means for hinging the framework to an end of the upper unit, and a self-adjustable resilient strut having one end thereof pivoted to a high point of an end of the upper unit and the other end thereof pivoted to the framework over the center wheel thereof.

EARL A. ERNST.

REFERENCES CITED

The following references are of record in the file of this patent:

UNITED STATES PATENTS

| Number | Name | Date |
|---|---|---|
| 1,271,627 | Stuart | July 9, 1918 |
| 1,576,910 | Hudson | Mar. 16, 1926 |
| 1,818,168 | Smith | Aug. 11, 1931 |
| 1,932,897 | Jaggard | Oct. 31, 1933 |